(12) United States Patent
Cap et al.

(10) Patent No.: US 8,784,998 B2
(45) Date of Patent: Jul. 22, 2014

(54) STRUCTURE HAVING NANOPHASE TITANIUM NODE AND NANOPHASE ALUMINUM STRUTS

(75) Inventors: Daniel P. Cap, Canoga Park, CA (US); Arunabh Bhattacharya, Canoga Park, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 442 days.

(21) Appl. No.: 12/872,010

(22) Filed: Aug. 31, 2010

(65) Prior Publication Data

US 2012/0052318 A1 Mar. 1, 2012

(51) Int. Cl.
*E04H 12/10* (2006.01)

(52) U.S. Cl.
USPC .......................................... 428/651; 428/654

(58) Field of Classification Search
CPC ....... E04H 12/00; E04H 12/08; E04H 12/085; E04H 12/10; E04H 12/2253; E04H 12/2269; E04H 12/2276; E04H 12/2292
USPC ................. 301/55, 56, 66, 73, 74, 79, 80, 84; 52/648.1, 655.1; 403/1, 179, 217
See application file for complete search history.

(56) References Cited

U.S. PATENT DOCUMENTS

| 15,297 | A | * | 7/1856 | Latta | 301/67 |
| 2,893,864 | A | * | 7/1959 | Geoffrey et al. | 420/419 |
| 4,308,699 | A | | 1/1982 | Slysh | |
| 5,419,619 | A | * | 5/1995 | Lew | 301/5.1 |
| 6,196,638 | B1 | * | 3/2001 | Mizuno et al. | 301/104 |
| 6,902,699 | B2 | * | 6/2005 | Fritzemeier et al. | 419/38 |
| 7,354,490 | B2 | | 4/2008 | Fritzemeier et al. | |
| 7,681,958 | B1 | * | 3/2010 | Bagdasarian | 301/80 |
| 2004/0128940 | A1 | | 7/2004 | LaForge | |
| 2006/0153728 | A1 | * | 7/2006 | Schoenung et al. | 419/32 |
| 2008/0069716 | A1 | * | 3/2008 | Chelluri et al. | 419/10 |
| 2009/0186238 | A1 | | 7/2009 | Bampton | |
| 2009/0188109 | A1 | | 7/2009 | Bampton et al. | |

FOREIGN PATENT DOCUMENTS

GB 2069943 A * 9/1981

OTHER PUBLICATIONS

The Aluminum Association, International Alloy Designations and Chemical Composition Limits for Wrought Aluminum and Wrought Aluminum Alloys, Feb. 2009.*
Constellation Program: America's Spacecraft for a New Generation of Explorers the Altair Lunar Lander; National Aeronautics and Space Administration; www.nasa.gov.

* cited by examiner

Primary Examiner — Adam Krupicka
(74) Attorney, Agent, or Firm — Carlson, Gaskey & Olds, P.C.

(57) ABSTRACT

A structure includes a nanophase titanium node and a plurality of nanophase aluminum struts. Each of the plurality of nanophase aluminum struts is bonded to the nanophase titanium node at a weld joint.

17 Claims, 1 Drawing Sheet

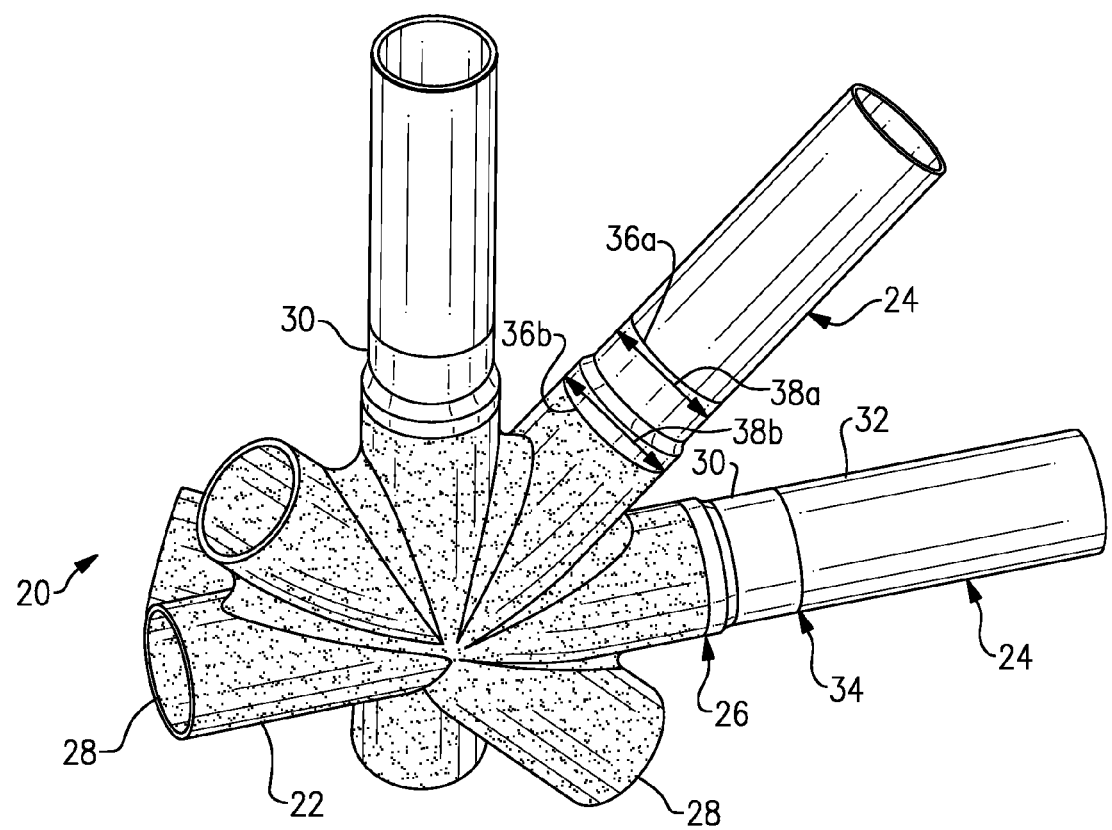

ized by diameter 38*a*, and the second
STRUCTURE HAVING NANOPHASE TITANIUM NODE AND NANOPHASE ALUMINUM STRUTS

BACKGROUND

This disclosure relates to lightweight, composite structures. Structures, such as space structures, utilize junctions that hold load-bearing struts together. To reduce weight, the struts and junctions may be made from polymer matrix composite materials, such as fiber-reinforced composites. However, the design of the polymer matrix composite with regard to fiber orientation and the like may not be suitable for unknown or complex load paths on the struts and junctions. The struts and junctions may therefore additionally utilize other materials, such as steel, to provide suitable strength. The steel adds weight, complicates joint design between steel components and polymer matrix composite components, and introduces compatibility issues between the different materials.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 illustrates an example structure having a nanophase titanium node and nanophase aluminum struts.

DETAILED DESCRIPTION OF THE PREFERRED EMBODIMENT

FIG. 1 illustrates selected portions of an example lightweight, high strength, composite structure 20, which may be used in a space structure, a lunar structure, a structure for a vehicle or other type of structure. In the disclosed example, the structure 20 includes a nanophase titanium node 22 and a plurality of nanophase aluminum struts 24. Generally, the use of nanophase aluminum and nanophase titanium alloys provide the structure with high strength and excellent specific fatigue properties.

Each of the plurality of nanophase aluminum struts 24 is joined to the nanophase titanium node 22 at a weld joint 26. For instance, the weld joint 26 may be formed using an inertia welding technique. Inertia welding provides the benefit of allowing dissimilar metallic alloys, such as nanophase titanium and nanophase aluminum, to be joined together in a strong weld bond.

The nanophase titanium node 22 includes a plurality of receivers 28 for attachment to the respective nanophase aluminum struts 24. The receivers 28 are circular openings that provide a surface for abutting an end of the nanophase aluminum struts 24 in a butt joint such that the nanophase aluminum struts 24 and receivers 28 may be welded together. That is, the cross-sectional shape of the receivers 28 corresponds to the cross-sectional shape of the ends of the nanophase aluminum struts 24. As shown, the receivers 28 and struts have circular cross-sections. Alternatively, the cross-sections may be rectangular, square, oval, polygonal, or other desired shape.

As shown, each of the nanophase aluminum struts 24 includes a nanophase titanium adapter 30 that is joined to a tube portion 32 at a weld joint 34. The tube portions 32 and the adapters 30 may be hollow, tubular structures. Each of the nanophase titanium adapters 30 includes a first end 36*a* and a second end 36*b*. The respective first ends 36*a* are joined to the respective tube portions 32 and the respective second ends 36*b* are joined to the corresponding receivers 28 of the nanophase titanium node 22.

Optionally, as shown, the first end 36*a* has a first cross-sectional area, as represented by diameter 38*a*, and the second end 36*b* is a flange having a second, greater cross-sectional area, as represented by diameter 38*b*. The first end 36*a* is inertia welded to the corresponding nanophase aluminum tube portion 32. The second end 36*b* is welded to the corresponding receiver 28 by using heat welding (e.g., tungsten inert gas, etc.). The larger cross-section flange of the second end 36*b* facilitates providing a strong weld to the receiver 28 of the nanophase titanium node 22. The nanophase titanium adapter 30 thereby facilitates a structural transition and strong weld between the nanophase aluminum struts 24 and the nanophase titanium node 22 by managing the stresses on the joint. For instance, the nanophase titanium adapters 30 reduce the overall stress on any one weld joint by distributing the stresses over the weld joints 26 and 34.

The nanophase aluminum struts 24, including the tube portions 32 are fabricated from a nanophase aluminum material. Generally, the term "nanophase" may refer to microstructural features, such as grain size, intermetallic phase, reinforcement phase, and the like that have an average size that is less than 100 nanometers. As an example, the nanophase aluminum material is an aluminum alloy having a nominal composition of at least about 0.2 wt. % of nitrogen, 88.7-98.7 wt. % of aluminum, and 1-11 wt. % of magnesium, lithium, silicon, titanium, zirconium or combinations thereof. In some examples, the metal is magnesium and is present in an amount of about 4-10 wt. %. The aluminum alloy may additionally include 6-14 wt. % of one or more additional metals selected from zinc, copper, cobalt, zirconium, and nickel. In a further example, the aluminum alloy may include approximately 7.5 wt. % of magnesium, approximately 0.2-0.4 wt. % of nitrogen, and a balance of aluminum.

The node 22 and adapter 30 are fabricated from a nanophase titanium material. As an example, the nanophase titanium material may have a nominal composition of 5.5-6.75 wt. % aluminum, 3.5-4. wt. % vanadium, 0.5-3.0 wt. % boron, and a balance of titanium. In some examples, the boron material contributes to the formation of a boride nanophase within the alloy. In a further example, the nanophase titanium material have a nominal composition of approximately 6 wt. % aluminum, 4 wt. % vanadium, 1.6 wt. % boron, and a balance titanium. One advantage of using nanophase titanium for the node 22 and adapter 30 is that the nanophase titanium facilitates weight reduction. The nanophase aluminum of the struts 24 provides sufficient mechanical properties for the struts 24 while maintaining a light weight. However, the nanophase aluminum does not have sufficient mechanical properties for the node 22. The nanophase titanium thereby provides the desired mechanical properties in the node 22 and adapter 30 while reducing weight compared to structures made of steel. In the above example compositions, the materials may consist essentially of the listed elements and impurities that do not affect the properties of the material or elements that are unmeasured or undetectable in the material. In a further example, the disclosed compositions do not include any other elements that are present in more than trace amounts as inadvertent impurities.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A structure comprising:
a nanophase titanium node having a plurality of receivers spaced around a central portion of the nanophase titanium node;
a plurality of nanophase aluminum struts each having a nanophase aluminum tube; and
a nanophase titanium adapter bonded to an end of the nanophase aluminum tube, each nanophase titanium adapter being bonded to a respective one of the plurality of receivers of the nanophase titanium node at a respective weld butt joint, each nanophase titanium adapter having a first end and a second end, the second end being bonded to the respective one of the plurality of receivers at the respective weld butt joint, wherein the nanophase titanium node, nanophase titanium adapter, and nanophase aluminum struts have microstructural features that are less than 100 nanometers in size.

2. The structure as recited in claim 1, wherein the nanophase aluminum struts have a nominal composition of at least 0.2 wt.% of nitrogen, 88.7-98.7 wt. % of aluminum, and 1-11 wt. % of a metal selected from a group consisting of magnesium, lithium, silicon, titanium, zirconium and combinations thereof.

3. The structure as recited in claim 2, wherein the nominal composition has 6-10.1 wt. % of an additional metal selected from the group consisting of zinc, copper, cobalt, nickel and combinations thereof.

4. The structure as recited in claim 2, wherein the nominal composition has 0.2-0.4 wt. % nitrogen.

5. The structure as recited in claim 1, wherein the nanophase titanium node has a nominal composition of 5.5-6.75 wt. % aluminum, 3.5-4.5 wt. % vanadium, 0.5-3.0 wt. % boron, and a balance of titanium.

6. The structure as recited in claim 5, wherein the nominal composition has 1.6-3.0 wt. % boron.

7. The structure as recited in claim 1, wherein each nanophase titanium adapter has a first cross sectional area at the first end and a second, greater cross sectional area at the second end.

8. The structure as recited in claim 1, wherein each nanophase titanium adapter includes a flange that is joined to the nanophase titanium node at the respective weld butt joint.

9. The structure as recited in claim 1, wherein the plurality of nanophase aluminum struts each have a nanophase titanium adapter joined thereto at a strut weld joint, and each nanophase titanium adapter is joined to a respective one of a plurality of receivers of the nanophase titanium node at the respective weld butt joint, each the respective weld butt joint being spaced apart from the corresponding strut weld joint.

10. The structure as recited in claim 1, wherein the microstructural features are at least one of grain sizes, intermetallic phases and reinforcement phases.

11. The structure as recited in claim 1, wherein the plurality of receivers extend outwardly, in respective directions, from the central portion of the node, and the direction of extension of one of the receivers is out-of-plane with respect to a plane containing the direction of extension of another one of the receivers.

12. A structure comprising:
a nanophase titanium node having a plurality of receivers spaced around a central portion of the nanophase titanium node;
a plurality of nanophase aluminum struts each having a nanophase aluminum tube; and
a nanophase titanium adapter metallurgically bonded to the nanophase aluminum tube, and each nanophase titanium adapter is metallurgically bonded to a respective one of the plurality of receivers at a respective weld butt joint, wherein the nanophase titanium node, nanophase titanium adapter, and nanophase aluminum struts have microstructural features that are less than 100 nanometers in size.

13. The structure as recited in claim 12, wherein the nanophase aluminum struts have a nominal composition of at least 0.2wt. % of nitrogen, 88.7-98.7 wt. % of aluminum, and 1-11 wt. % of a metal selected from a group consisting of magnesium, lithium, silicon, titanium, zirconium and combinations thereof.

14. The structure as recited in claim 12, wherein the nanophase titanium node has a nominal composition of 5.5-6.75 wt. % aluminum, 3.5-4.5 wt. % vanadium, 0.5-3.0 wt. % boron, and a remainder of titanium.

15. The structure as recited in claim 12, wherein each nanophase titanium adapter has a first cross sectional area at a first end and a second, greater cross sectional area at a second end, and the second end is bonded to the respective one of the plurality of receivers at the respective weld butt joint.

16. The structure as recited in claim 12, wherein the microstructural features are at least one of grain sizes, intermetallic phases and reinforcement phases.

17. The structure as recited in claim 12, wherein the plurality of receivers extend outwardly, in respective directions, from the central portion of the node, and the direction of extension of one of the receivers is out-of-plane with respect to a plane containing the direction of extension of another one of the receivers.

* * * * *